United States Patent [19]

Tassery

[11] Patent Number: 4,584,618

[45] Date of Patent: Apr. 22, 1986

[54] AUDIO RECORDER WHICH CAN PLAY BACK A TEMPORAL CODE IRRESPECTIVE OF THE SPEED OF THE MAGNETIC TAPE

[75] Inventor: Michel Tassery, Deuil La Barre, France

[73] Assignee: Thomson-CSF, Paris, France

[21] Appl. No.: 658,557

[22] Filed: Oct. 9, 1984

[30] Foreign Application Priority Data

Oct. 11, 1983 [FR] France ................. 83 16139

[51] Int. Cl.$^4$ ............................................. G11B 5/52
[52] U.S. Cl. ........................................ 360/70; 360/75
[58] Field of Search ................................... 360/70, 75

[56] References Cited

U.S. PATENT DOCUMENTS

| | | | |
|---|---|---|---|
| 2,539,837 | 1/1951 | Howell | 274/4 |
| 3,197,575 | 7/1965 | Eckstein | 179/100.2 |
| 3,454,713 | 7/1969 | Yanagimachi et al. | 360/70 X |
| 3,596,004 | 7/1971 | Prochnow | 360/75 X |
| 3,761,646 | 9/1973 | Beauviala | 360/75 X |
| 3,806,786 | 4/1974 | Inaba | 360/75 X |
| 4,282,552 | 8/1981 | Tachi et al. | 360/70 |

FOREIGN PATENT DOCUMENTS 1168424 12/1958 France .
1459976 11/1966 France .

OTHER PUBLICATIONS

IBM Technical Disclosure Bulletin, vol. 10, No. 12, May 1968, C. J. Davis et al.: "Sampling Device for Magnetically Recorded Information", pp. 1849-1850.
Journal of the Society of Motion Picture and Television Engineers, vol. 88, No. 10, Oct. 1979, G. W. Bates et al.: "Time Code Error Correction Utilizing a Microprocessor", pp. 712-715.

Primary Examiner—George G. Stellar
Attorney, Agent, or Firm—Oblon, Fisher, Spivak, McClelland & Maier

[57] ABSTRACT

An audio tape recorder comprises, over and above the conventional recording and playback heads, two playback heads incorporated in a rotary drum driven by a servo controlled motor operated by a servo control device. The playback heads are connected to a code word decoder of known kind, supplying synchronizing signals to the servo control device. When the absolute tape running speed is nil or smaller than the its nominal speed, the playback heads turn at a relative speed equal to the nominal tape running speed. When the absolute tape running speed is greater than its nominal speed, the rotary drum is stopped and the servo control device operates to provide positional servo control, as a function of the phase of the synchronizing signals supplied by the decoder.

4 Claims, 2 Drawing Figures

AUDIO RECORDER WHICH CAN PLAY BACK A TEMPORAL CODE IRRESPECTIVE OF THE SPEED OF THE MAGNETIC TAPE

BACKGROUND OF THE INVENTION

The invention relates to audio recorders which are utilised in parallel with video recorders for the purpose of recording an audio signal on the one hand and a video signal on the other hand, on two separate magnetic tapes. Recording the audio signal on another magnetic tape than that of the video recorder permits securing an improved sound quality. For editing the sequences, the audio and video recordings have to be located and synchronised. The SMPTE and EBU organisations have established a standard specifying a digital code and a modulation method permitting reference and synchronising signals to be recorded on the video and audio tapes.

According to this standard, each video image (two frames) is associated with a code word comprising 80 bits, formed by temporal data bits and by control bits. The temporal data bits code the tens of hours, hours, tens of minutes, minutes, tens of seconds, seconds, tens of images and images. The last 16 bits of the code word form a synchronising word which permits the referencing of the code word and detecting the direction of travel of the tape.

The standardised modulation method is such that a first logic level transition appears at the start of each period of bits. In the case of an O, there is no second transition during the period of the bit. In the case of an I, a second transition appears half a period after the start of the bit.

On a video tape, the code word may be recorded on a track separate from the video track and referred to as the audio or "cue" track 3. Another method consists in recording it on the video recording track, during the frame suppression interval separating each image from the following image. On a magnetic audio tape, the code word is recorded on a track separate from the audio tracks. During playback, the decoding of the code word is performed by means of known devices permitting reading and decoding irrespective of the running speed of the magnetic tape between one fifth and a hundred times the nominal playback speed, whether on the video tape or on the audio tape.

In the case of stopping on an image, the speed of the video tape is nil, the reading of the code word is impossible unless it is recorded within the frame suppression interval. In this case, the reading or playback is performed by the magnetic head performing the reading of the video signal; this head being installed on a rotary drum, the reading of the code word occurs whilst stopped on the image, in the same manner as the reading of the video signal. If the code word is recorded on the audio track 3, the reading of the code word is possible only whilst the tape is in translatory motion at a speed equal to at least one fith of the scheduled speed, and the same applies to reading the code word on the magnetic audio tape. In the case of a video recorder the problem is resolved by recording the code word within the frame suppression interval, whereas, on the contrary, there is no method of resolving this problem for a tape recorder.

The impossibility of reading the temporal code of the audio tape during a stop on the image has the result that it becomes difficult to synchronise the sound and upon image editing the sequences.

The audio recorder according to the invention resolves this problem by means of a moving magnetic head permitting reading of the code word irrespective of the speed of the magnetic tape, even if this speed is zero.

SUMMARY OF THE INVENTION

In accordance with the invention, an audio recorder permitting the reading of a temporal code irrespective of the running speed of the magnetic tape, this temporal code being recorded on a track separate from the audio track or tracks, comprises:

at teast one head for reading the temporal code, in contact with the tape and arranged to turn along a trajectory sweeping a segment of the temporal code track;

a servo controlled motor enabling the read head to be turned;

a servo control device controlling the motor so that there is always a displacement of the read head with respect to the temporal code track, irrespective of the absolute speed of displacement of the tape;

a temporal code decoder connected to the read head for decoding the temporal code and for supplying servo control signals to the servo control device.

BRIEF DESCRIPTION OF THE DRAWINGS

A clearer understanding of the invention will be obtained from the following description and from the accompanying drawings, in which.

DESCRIPTION OF THE PREFERRED EMBODIMENT

Figure 1:
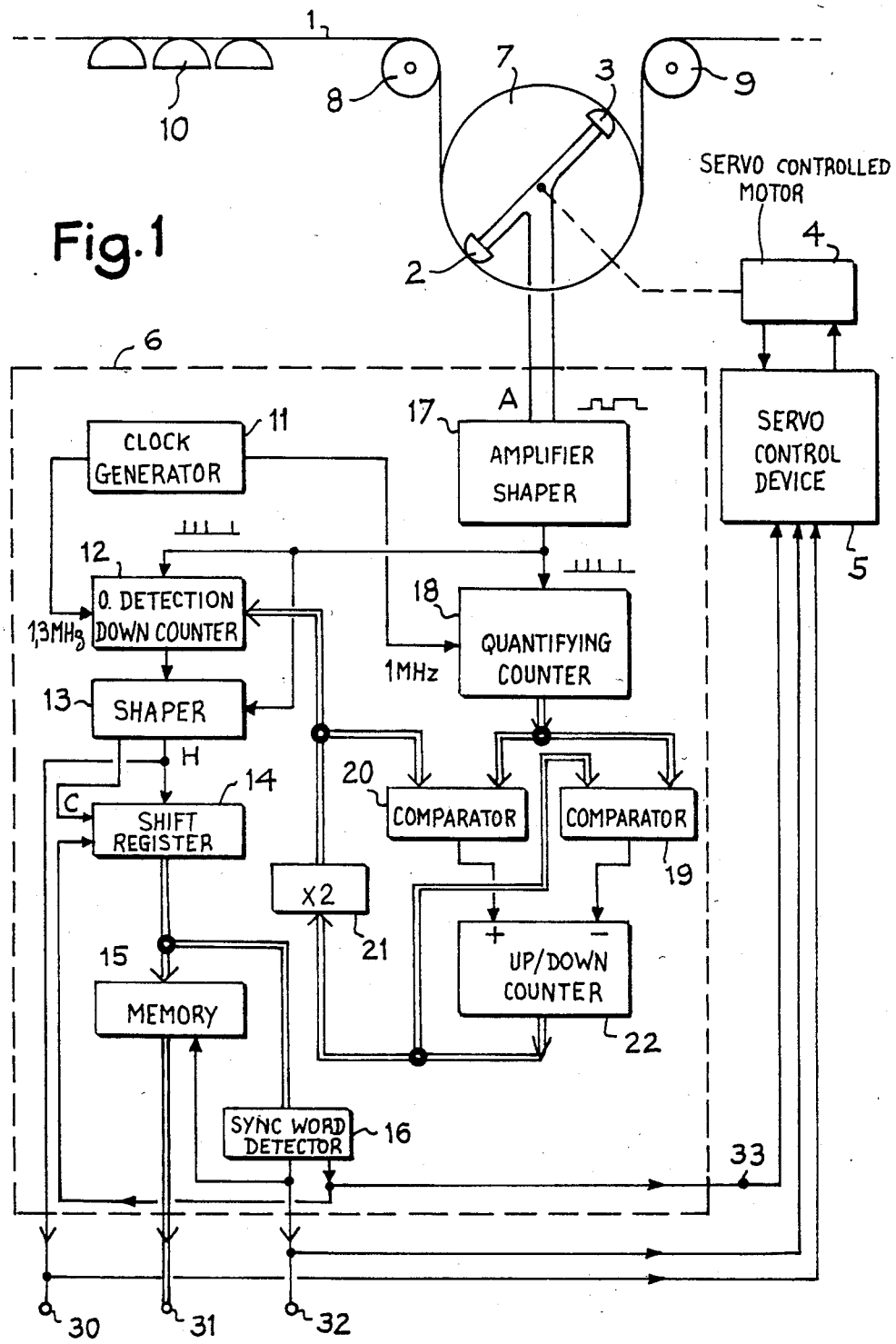
FIG. 1 shows the block diagram of one embodiment of the tape recorder in accordance with the invention.

In FIG. 1, this embodiment comprises a magnetic tape 1 passing in front of conventional audio recording and playback heads 10, being guided by rollers 8 and 9 and passing around a rotary drum 7 carrying two heads 2 and 3 for reading the code words. The code words are recorded on a track parallel to the audio tracks and separate from these. The reading or playback heads 2 and 3 are situated at the two extremities of a diameter of the rotary drum 7 and the rollers 8 and 9 are arranged in a manner such that the magnetic tape is in contact with the drem 7 over a surface a little greater than half its periphery. As a rule, the playback head 3 is not in contact with the magnetic tape whilst the playback head 2 is in contact with the same, and vice versa. The heads 2 and 3 are electrically connected in series so that the code word track is read continuously by one of these two heads. The diameter of the drum is selected to be such that a recording of one syncrhonising word is diametrically opposite to a recording of another synchronising word. The binary data contained in the code words are decoded by a decoder 6 connected to the heads 2 and 3. The playback and decoding operations may consequently be performed in both directions of travel.

The rotary drum 7 is driven by a servo controlled motor 4 operated by a servo control device 5. The servo controlled motor 4 feeds a positional signal to the servo control device 5 to apprise the latter at all times of the position and absolute speed of rotation of the heads 2 and 3. In this embodiment, the relative speed of the playback heads 2 and 3 with respect to the tape 1 is servo controlled in order to keep the same constant and equal to the scheduled speed of the magnetic tape, when the absolute running speed of the tape lies between a zero speed and the scheduled speed. When the absolute speed has its scheduled value, the rotary drum 7 has a speed of rotation equal to zero and the servo control function operates as a servo positional control. The rotational phase of the rotary drum 7, or its position, is defined as a function of the phase of a clock signal at the frequency of the bits and of a signal at the frequency of the synchronising words, supplied by the decoder 6 as a function of the signal read on the code track.

When the magnetic tape has an absolute running speed higher than the scheduled running speed, and able to rise to 100 times this scheduled speed, the rotary drum 7 is held stopped by the positive control function which then operates as a positional servo control and the decoder 6 operates in a manner identical to the operation with a stationary playback head in the known devices, that is to say that it follows the variations of the speed of the magnetic tape.

The servo control function maintains a position or phase of rotation of the heads 2 and 3, such that a simultaneous playback by both heads can occur only for the synchronising words.

For example, the decoder 6 may be the TTV4020 decoder sold by THOMSON-CSF. The decoder 6 has four output terminals, 30,31,32 and 33, the terminals 30,32 and 33 being connected to the servo control device 5 to supply the latter with a signal at the frequency of the bits, a signal at the frequency of the code words, and a signal indicating the direction of travel of the tape 1. The output terminal 31 supplies a binary word of 80 bits formed from the code word read on the magnetic tape.

The device 6 comprises a clock generator 11, a down counter 12, a shaper device 13, a shift register 14, a memory 15, a device 16 for detecting the synchronising words, an amplifier and shaper device 17, a quantifying counter 18, two comparators 19 and 20, a multiplication-by-two device 21, and an up/down counter 22.

The amplifier and shaper device 17 receives a signal A supplied by the playback heads 2 and 3. This signal is a binary signal in which each bit of the code word is coded in series, a value 1 being coded by two successive transitions whereas a value 0 is coded by a single transition. The device 17 provides a signal of specified amplitude formed by a short pulse for each rising or descending front of the signal A. These pulses are fed to a zero reset input of the counter 18 referred to as a quantifying counter. The latter receives a clock signal having the frequency 1 MHz, supplied by the clock generator 11.

An output of the counter 18 provides a binary word of which the value is proportional to the time elapsed since the last zero reset by means of a pulse corresponding to one transition of the signal A, and this binary word is supplied to a first input of the comparator 19 and to a first input of the comparator 20. A second input of the comparator 19 receives a binary word supplied by an ouput of the up - down counter 22, and a second input of the comparator 20 receives the same binary word but of which the value has been multiplied by two by means of a shift performed by the device 21. The value of the binary word provided by the up - down counter 22 corresponds at any instant, to the period during which the signal A retains a constant level for the transmission of a value 0, which period varies with the running speed of the tape.

When the time interval between two transitions of the signal A is smaller than the value supplied by the up - down counter 22, the comparator 19 provides a logic signal operating the up - down counter 22 to decrement its contents. When the time interval between two transitions of the signal A is greater than double the value furnished by the up - down counter 22, the comparator 20 provides a control signal to the up - down counter 22 to increment its count. The value supplied by the doubling multiplier device 21 is utilised as a period of reference to detect the 0 values transmitted by the signal A, by means of the down counter 12.

This value is fed to a precharging input of the down counter 12, referred to as an O detection down counter. The down counter 12 also receives the signal supplied by the amplifier and shaper device 17, and a clock signal at the frequency 1.333 MHz. The pulses corresponding to the transitions of the signal A cause the down counter 12 to be charged with the value supplied by the device 21. When the contents of the down counter 12 pass through the value zero, which is the case only for the intervals corresponding to the transmission of a 0 value, one output of the down counter 12 feeds a logic signal to the shaper device 13. The time intervals between two transitions of the signal A which correspond to the transmission of a 1 value have too short a duration for the value precharged to be counted down completely, the next pulse consequently again causes precharging before the contents of the down counter 12 had been counted down to 0. The logic signal supplied by the output of the down counter 12 corresponds to the transmission of a 0 value, in the contrary case.

This signal is fed to the shaper device 13 as well as the signal provided by the output of the device 17. The device 13 restores a clock signal H to the frequency of the bits, obtained from the signal A and from the signal supplied by the output of the device 17, by causing a rising or descending transition in the signal A as a function of its logic level, at the instants in which the down counter 12 passes through the value 0. The signal H obtained in this manner is a signal having the frequency of the bits but of which the cyclic ratio is variable. On the one hand, the device 13 decodes the succession of values transmitted, starting with the succession of pulses supplied by the output of the device 17 and based on the logic signal supplied by the down counter 12. One output of the device 13 consequently supplies a signal C in which a 0 value is represented by a low logic level and a 1 value by a high logic level. These values are transmitted in serial form to the shift register 14 in which they are stored under the action of the clock signal H.

When the 80 bits of a code word are available in the shift register 14, the device 16 for detection of the synchronising word detects that the last 16 bits stored in the shift register 14 have the value expected for the synchronising word. The device 16 then generates a logic signal causing storage in parallel form of the contents of the register 14 in the memory 15 which forms a buffer memory for supplying the code word to the output terminal 31. On the other hand, the signal provided by the device 16 is fed to the output terminal 32 and to the servo control device 5. The clock signal H is fed to the output terminal 30 and to the servo control device 5.

The device 16 permits detecting the synchronising word no matter what the running direction of the magnetic tape 1 may be, and it provides an additional signal denoting this running direction. This additional signal is supplied to the servo control device 5 and to the register 14 to control the shifting direction in this register.

Figure 2:
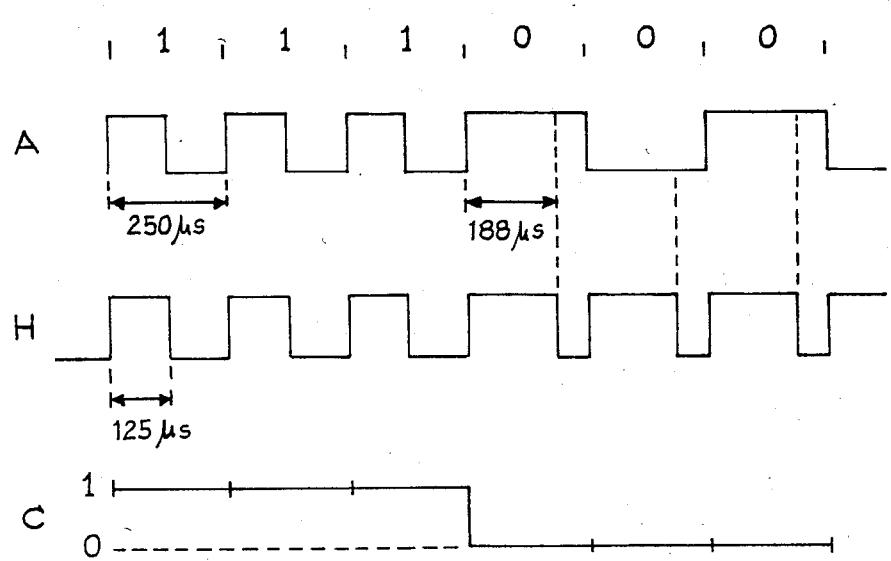
FIG. 2 illustrates timing diagrams showing the operation of this embodiment.

FIG. 2 illustrates the temporal graphs of the signal A, of the signal H and of the signal C, upon reading the values 111000, when the relative speed of the read heads 2 and 3 with respect to the tape 1 is equal to the nominal running speed of the tape. The period of the bits then amounts to 250 microseconds. The signal H is identical to the signal A during the periods in which the values transmitted are 1's, whereas by contrast it consists of positive pulses of a duration of 188 microseconds when the values transmitted are 0's, since the passage through zero of the down counter 12 occurs 188 microseconds after the precharging pulse which corresponds to the onset of the period of one bit, the clock frequency of the down counter 12 being equal to 1.3 MHz so that the contents of the deducting counter 12 may pass through the value 0 after an intermediate deducting period lying between the period (125 microseconds) of the signal A for a value 1 and the period (250 microseconds) of the signal A for a value 0. The signal H is formed by a pulsed signal having the period of 250 microseconds but of which the pulses at the level 1 have a duration of 125 microseconds on one occasion and of 188 microseconds on another occasion. The signal C restores the bits of the code word in the conventional form of a high logic level for a value 1 and of a low logic level for a value 0.

The invention is not limited to the embodiment described in the foregoing, and it lies within the scope of one skilled in the art to effect numerous modified forms comprising a number of different playback heads, possibly switched automatically during the rotation of the drum. The number of playback heads should become the greater the smaller the drum sector in contact with the tape. For example, if this sector corresponds to a third of the circumference of the drum, it is necessary to make use of three playback heads evenly distributed over the circumference of the drum, to prevent the absence of contact at particular instants between any of the playback heads and the magnetic tape.

It lies within the capabilities of one skilled in the art to produce the decoding device 6 in a different manner and to adapt the same to provide a servo control signal. The embodiment of the servo controlled motor 4 and of the servo control device 5 are very conventional in the field of magnetic video tapes.

The relative speed of the playback heads 2 and 3 may be governed at a value differing from the absolute nominal running speed value of the tape 1, since the decoder 6 may operate when this relative speed is comprised between one fifth and 100 times the scheduled speed.

What is claimed is:

1. An audio recorder permitting the reading of a temporal code irrespective of the running speed of the tape, this temporal code being recorded on a track separate from the audio track or tracks, comprising:
    at least one head for reading the temporal code, in contact with the tape and free to turn along a trajectory sweeping a segment of the temporal code track,
    a servo controlled motor by means of which the reading head may be made to turn,
    a servo control device controlling the motor so that a displacement of the reading head always occurs with respect to the temporal code track, irrespective of the absolute speed of displacement of the tape,
    a temporal code decoder connected to the reading head for decoding the temporal code and for supplying servo control signals to the servo control device.

2. A tape recorder according to claim 1, in which the servo control device maintains a predetermined relative speed between the reading or playback head and the tape, if the absolute running speed of the tape is smaller than its scheduled value, irrespective of the running direction of the tape, and in which the servo control device determines the position of the reading head as a function of the phase of the signal read on the temporal code track, if the absolute running speed of the tape is greater than or equal to its scheduled value, irrespective of the running direction of the tape.

3. An audio recorder according to claim 1, comprising a plurality of reading heads evenly distributed over the circumference of a rotary drum, driven by a servo controlled motor, and means for guiding the tape keeping the same in contact with the drum over a sufficient surface to assure that at least one reading head is always in contact with the tape, and that there is always at least one complete word of the temporal code on this surface.

4. An audio recorder according to claim 3, comprising two reading heads situated at the two extremities of a diameter of the rotary drum, these heads being electrically connected in series, and in which the contact surface of the tape on the drum corresponds to at least half the circumference of the latter.

* * * * *